(12) United States Patent
Zhu

(10) Patent No.: US 6,667,862 B2
(45) Date of Patent: Dec. 23, 2003

(54) MAGNETORESISTIVE READ HEAD HAVING PERMANENT MAGNET ON TOP OF MAGNETORESISTIVE ELEMENT

(75) Inventor: Jian-Gang Zhu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 243 days.

(21) Appl. No.: 09/790,193

(22) Filed: Feb. 20, 2001

(65) Prior Publication Data

US 2002/0114111 A1 Aug. 22, 2002

(51) Int. Cl.[7] .................................................. G11B 5/39
(52) U.S. Cl. .................................................. 360/324.12
(58) Field of Search ............................... 360/324–324.2

(56) References Cited

U.S. PATENT DOCUMENTS

| | | |
|---|---|---|
| 5,390,061 A | 2/1995 | Nakatani et al. |
| 5,576,914 A | 11/1996 | Rottmayer et al. |
| 5,696,656 A | 12/1997 | Gill et al. |
| 5,729,410 A | 3/1998 | Fontana, Jr. et al. |
| 5,768,071 A | 6/1998 | Lin |
| 5,828,530 A | 10/1998 | Gill et al. |
| 5,867,351 A | 2/1999 | Gill |
| 5,898,547 A | 4/1999 | Fontana, Jr. et al. |
| 5,898,548 A | 4/1999 | Dill et al. |
| 5,901,018 A | 5/1999 | Fontana, Jr. et al. |
| 5,958,611 A | 9/1999 | Ohta et al. |
| 5,974,657 A | 11/1999 | Fox et al. |
| 5,999,379 A | 12/1999 | Hsiao et al. |
| 6,005,753 A | 12/1999 | Fontana, Jr. et al. |
| 6,023,395 A | 2/2000 | Dill et al. |
| 6,256,176 B1 * | 7/2001 | Mao et al. ............... 360/324.1 |

* cited by examiner

Primary Examiner—A. J. Heinz
(74) Attorney, Agent, or Firm—Kirkpatrick & Lockhart LLP

(57) ABSTRACT

A magnetoresistive read head. The magnetoresistive read head includes a magnetoresistive element including a lower surface and an upper surface, wherein an electrical resistance of the magnetoresistive element varies in response to varying magnetic fields adjacent to the lower surface of the magnetoresistive element, and a magnetic element adjacent to the upper surface of the magnetoresistive element.

35 Claims, 8 Drawing Sheets

MAGNETORESISTIVE READ HEAD HAVING PERMANENT MAGNET ON TOP OF MAGNETORESISTIVE ELEMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to magnetically recorded data and, more particularly, to magnetoresistive read heads for reading magnetically recorded data.

2. Description of the Background

Magnetoresistive (MR) materials are materials whose electrical resistance changes when brought in contact with a magnetic field. Because of this property, MR materials are often used in the read element of a read/write head used to read data recorded on a high-density magnetic disk. Unlike inductive heads in which the data bit on the medium induces the current across a gap, the MR mechanism is an active element with current flowing through it. The magnetic orientation of the bit increases the resistance in a thin-film, nickel-iron layer of the MR read head, and the difference in current is detected by a read circuit coupled to the MR read head. Because MR heads are more sensitive to weaker fields than the earlier inductive read coils, MR read heads are widely used in magnetic data storage systems because as storage capacity increases, the bit gets smaller and its magnetic field becomes weaker.

A giant magnetoresistive (GMR) head is a MR head which includes additional thin films in the sensing element to enhance the change in resistance caused by a magnetic field. Consequently, GMR heads are more sensitive to weaker fields than conventional MR heads. Accordingly, as the storage density of magnetic data storage media continues to double approximately every sixteen months, GMR read heads are becoming increasingly prevalent.

A typical GMR read head includes a GMR sensing layer sandwiched between two shield layers. The GMR sensing layer is typically formed in a patterned multilayer structure including at least a non-magnetic metal layer sandwiched by two ferromagnetic layers. When the magnetic moments of the ferromagnetic layers are parallel, the GMR sensing layer has a low electrical resistance. Conversely, when the magnetic moments of the ferromagnetic layers are anti-parallel, the GMR sensing layer has a high electrical resistance. The resolution of the read element is inversely proportional to the distance (or gap) between the shield layers. Accordingly, the smaller the gap (or window), the greater the resolution of the read element, hence permitting the data to be recorded more densely on the recording medium.

One known type of high-density read head design including a GMR sensing layer is a spin valve read head. In this structure, at least one anti-ferromagnetic layer is formed adjacent to one of the ferromagnetic layers of the GMR sensing layer to pin the magnetization of that ferromagnetic layer such that the direction of the magnetic spin of the pinned ferromagnetic layer is fixed in the range of several tens to several hundreds Oersted (Oe) in magnetic field. On the other hand, the direction of the magnetic spin of the free ferromagnetic layer is freely varied by an external magnetic field. As a result, there can be achieved a magnetoresistance change ratio (MR ratio) of two to five percent in a small magnetic field range.

According to spin valve read head designs, the anti-ferromagnetic layer must be sufficiently sized to pin the magnetization of the pinned ferromagnetic layer. Accordingly, there is a practical limit to how thin the anti-ferromagnetic layer may be fabricated, preventing further reduction of the shield-to-shield spacing, hence limiting the linear recording density. For current spin valve and advanced spin valve head designs, the anti-ferromagnetic layer typically has a thickness greater than 15 nm. As a result, the width of the GMR element of current and advanced spin valve head designs is ordinarily 30 nm or greater, which is too wide for higher density applications, such as on the order of 100 Gbits/sq inch.

Accordingly, there exists a need for a magnetoresistive read head that has a high sensitivity to even weak magnetic fields as well as a reduced shield-to-shield spacing, thereby permitting a further increase in linear recording densities.

SUMMARY OF THE INVENTION

The present invention is directed to a magnetoresistive read head. According to one embodiment, the magnetoresistive read head includes a magnetoresistive element including a lower surface and an upper surface, wherein an electrical resistance of the magnetoresistive element varies in response to varying magnetic fields adjacent to the lower surface of the magnetoresistive element, and a magnetic element adjacent to the upper surface of the magnetoresistive element. The magnetoresistive element may be, for example, a giant magnetoresistive (GMR) element or a tunneling magnetoresistive (TMR) element.

The read head of the present invention eliminates the need for an anti-ferromagnetic film in the active region of the read sensor, which is required for the spin valve read head structure. Consequently, the read head of the present invention enables a much thinner read sensor to be utilized, leading to a much smaller shield to shield spacing in the active region, hence permitting data to be recorded more densely on a magnetic recording medium. According to one embodiment of the present invention, the read sensor may have an effective track width of less than 0.1 $\mu$m, thus permitting recording densities of, for example, 100 Gbits/sq inch. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a read head. For example, details of the read circuit are not shown herein. Those of ordinary skill in the art will recognize, however, that these and other elements may be desirable in a typical read head. However, because such elements are well known in the art, and because they do not facilitate a better understanding of the present invention, a discussion of such elements is not provided herein.

Figure 1:
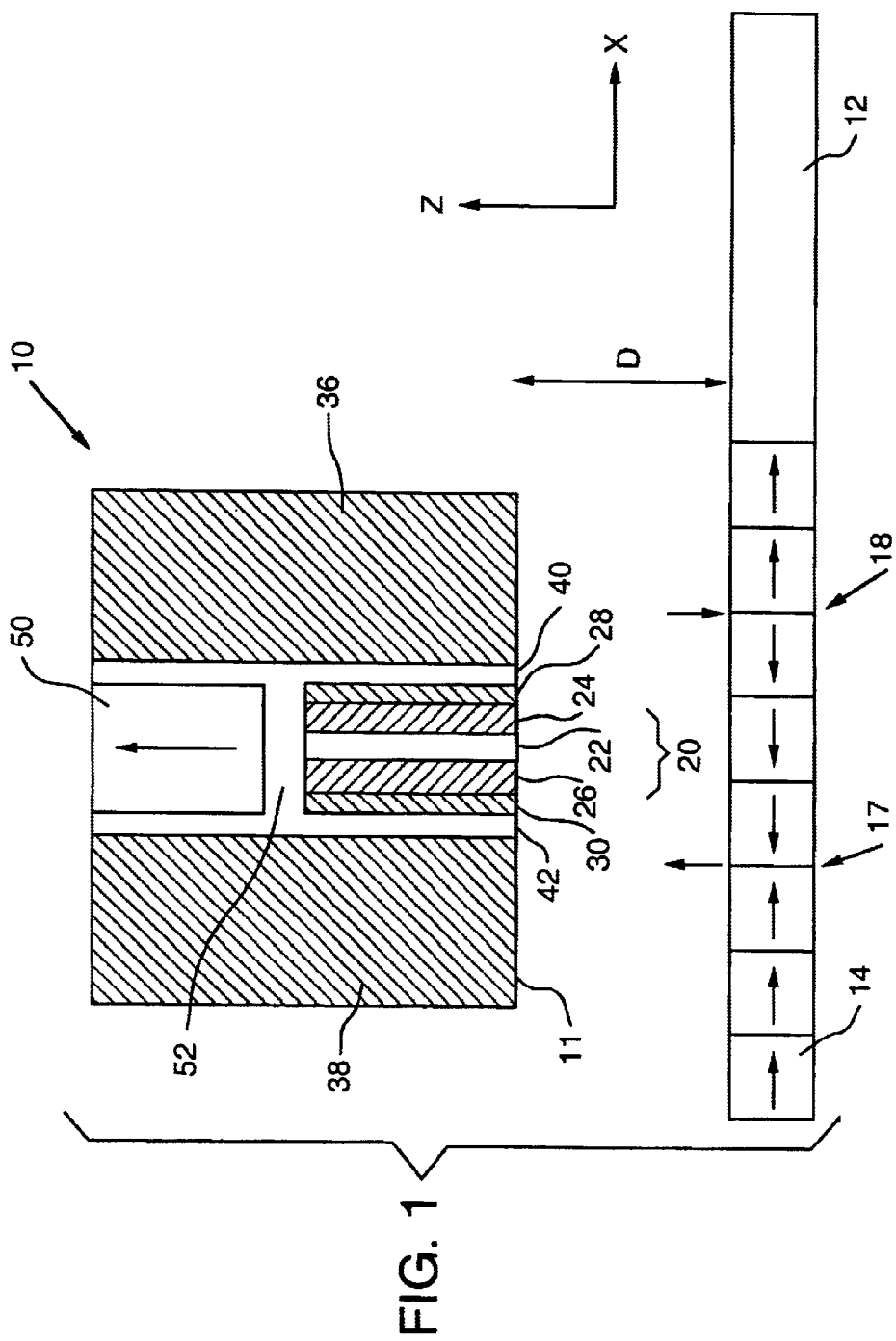
FIG. 1 is a cross-sectional front side view of a read head according to one embodiment of the present invention.
Figure 2:
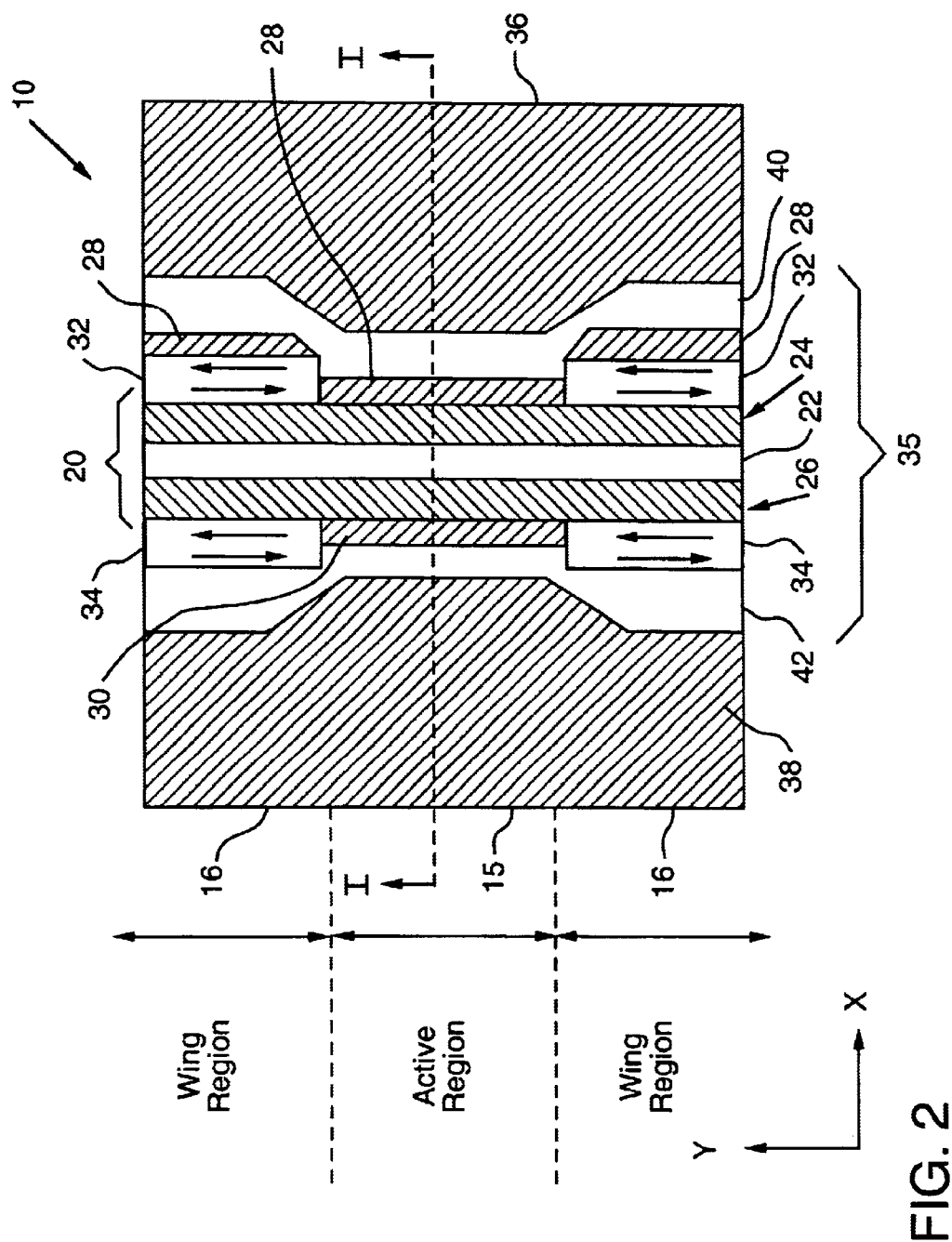
FIG. 2 is a bottom view of the read head of FIG. 1 according to one embodiment of the present invention.

One embodiment of the read head 10 of the present invention will be described in conjunction with FIGS. 1 and 2, wherein FIG. 1 is a cross-sectional front side view of the read head 10 and FIG. 2 is a bottom view of the read head 10. The cross-sectional view of the read head 10 in FIG. 1 is taken along line I—I of FIG. 2. As seen in FIG. 2, the read head 10 may include an active region 15 and two adjacent wing regions 16. FIG. 1 is a cross-sectional view of the active region 15 of the read head 10.

The read head 10 may be used to read data from a magnetic medium 12 adjacent to a lower surface 11 of the read head 10. The magnetic medium 12 may include a number of pre-oriented flux regions 14 defined on its surface, each directed in either the +X or −x direction, relative to the Cartesian coordinate grid shown in FIG. 1. Opposingly-oriented flux regions 14 of the medium 12 define transitions, such as transitions 17, 18 illustrated in FIG. 1, which produce magnetic fringe fields extending in the +Z and −z directions respectively beyond the medium 12. The read head 10 may be positioned on an air bearing slider (not shown) in order that the read head 10 may move relative to the magnetic medium 12 along the +/− X direction at an aerodynamically-defined distance D. As the read head 10 moves relative to the medium 12, a giant magnetoresistive (GMR) element 20 detects the flux or fringe fields produced by oppositely-oriented flux regions 14, thereby causing a change in the electrical resistance of the GMR element 20. The change in the electrical resistance of the GMR element 20 may be detected by a read circuit (not shown) of the read head 10. The read circuit may send a reference current through the GMR element 20 such that the reference current may pass through the GMR element 20 in a so-called "CIP"(Current In Plane) mode.

The GMR element 20, according to one embodiment of the present invention, includes a non-magnetic metal layer 22 and adjacent ferromagnetic layers 24, 26. In the active region 15 of the read head 10, electrically conductive lead layers 28, 30 are adjacent to the GMR element 20 to provide an electrical connection between the GMR element 20 and the read circuit used to detect changes in the electrical resistance of the GMR element 20 caused by the transitions in the opposingly-oriented flux regions 14.

In the wing regions 16, anti-ferromagnetic layers 32, 34 are adjacent to the ferromagnetic layers 24, 26 respectively. The anti-ferromagnetic layers 32, 34 provide exchange pinning for the magnetizations of the of the respective ferromagnetic layers 24, 26. The orientation of the magnetization of these layers is indicated with the arrows in FIG. 2. As indicated in FIG. 2, the magnetizations of the ferromagnetic layers 24, 26 are pinned in the wing regions 16 by the anti-ferromagnetic layers 32, 34 in substantially opposite directions, with a small asymmetry in the +/−X directions respectively. This small asymmetry is designed to balance the opposite magnetic fields in the ferromagnetic layers 24, 26 caused by the sensing current. Also in the wing regions 16, according to one embodiment, the conductive lead layer 28 may be adjacent to the anti-ferromagnetic layer 32, and the conductive lead layer 30 may be eliminated from the wing regions 16.

The non-magnetic metal layer 22 of the GMR element 20 may be fabricated from an electrically conductive/ magnetically non-conductive material such as, for example, copper, and may have a thickness of, for example, less than 50 Å and, according to one embodiment, may be approximately 20 Å. The ferromagnetic layers 24, 26 may be fabricated from a magnetic material such as, for example, a nickel-iron-cobalt (NiFeCo) composition, and may each have a thickness of, for example, less than 50 Å and, according to one embodiment, may be approximately 20 Å. The electrically conductive lead layers 28, 30 may be fabricated from an electrically conductive/magnetically non-conductive material such as, for example, copper, and may each have a thickness of, for example, 5–10 Å. These five layers (i.e., the non-magnetic metal layer 22 and the ferromagnetic layers 24, 26 of the GMR element 20, plus the electrically conductive lead layers 28, 30) are sometimes referred to as the active region read sensor hereinafter.

The anti-ferromagnetic layers 32, 34 may be fabricated from an anti-ferromagnetic material such as, for example, IrMn, IrPtPd, IrPt, or NiMn, and may have a thickness of, for example, approximately 200 nm. The non-magnetic metal layer 22 and the ferromagnetic layers 24, 26 of the GMR element 20, plus the anti-ferromagnetic layers 32, 34 and the electrically conductive lead layer 28 are sometimes collectively referred to as the wing region read sensor hereinafter. Collectively, the active region read sensor and the wing region read sensor are sometimes referred to as the sensor stack 35 hereinafter.

The sensor stack 35 is positioned between two shield layers 36, 38, with insulating layers 40, 42 separating the shield layers 36, 38 from the sensor stack 35. The shield layers 36, 38 may be fabricated, for example, from a soft magnetic material such as, for example, nickel-iron (NiFe). The insulating layers 40, 42 may be fabricated from an electrically non-conductive material such as, for example, aluminum oxide ($Al_2O_3$), and may have a sufficient thickness to prevent the conduction of electrical current between the GMR element 20 and the shield layers 36, 38. According to one embodiment, the insulating layers 40, 42 may have a thickness of, for example, approximately 16 nm (or 160 Å).

The read head 10 also includes a magnetic element 50 configured above the active region read sensor relative to the surface 11 adjacent to the magnetic medium 12. According to one embodiment, the magnetic element 50 may extend in the +/−Y direction above the GMR element 20 in the wing regions 16. The magnetic element 50 may be insulated from the shield layers 36, 38 by the insulating layers 40, 42. The magnetic element 50 may also be insulated from the active region read sensor by an insulating layer 52, which may be similar in composition to the insulating layers 40, 42. The magnetic element 50 may have a magnetization oriented in the Z direction such that it is substantially orthogonal to the magnetization of the ferromagnetic layers 24, 26. Consequently, the magnetic element 50 may create a transverse bias field in the two ferromagnetic layers 24, 26. The magnetic element 50 may be fabricated from a permanent magnetic material such as, for example, a cobalt/platinum alloy. According to another embodiment, as described further hereinbelow in connection with FIG. 4, the magnetic element 50 may be fabricated from a soft magnetic material.

Figure 3:
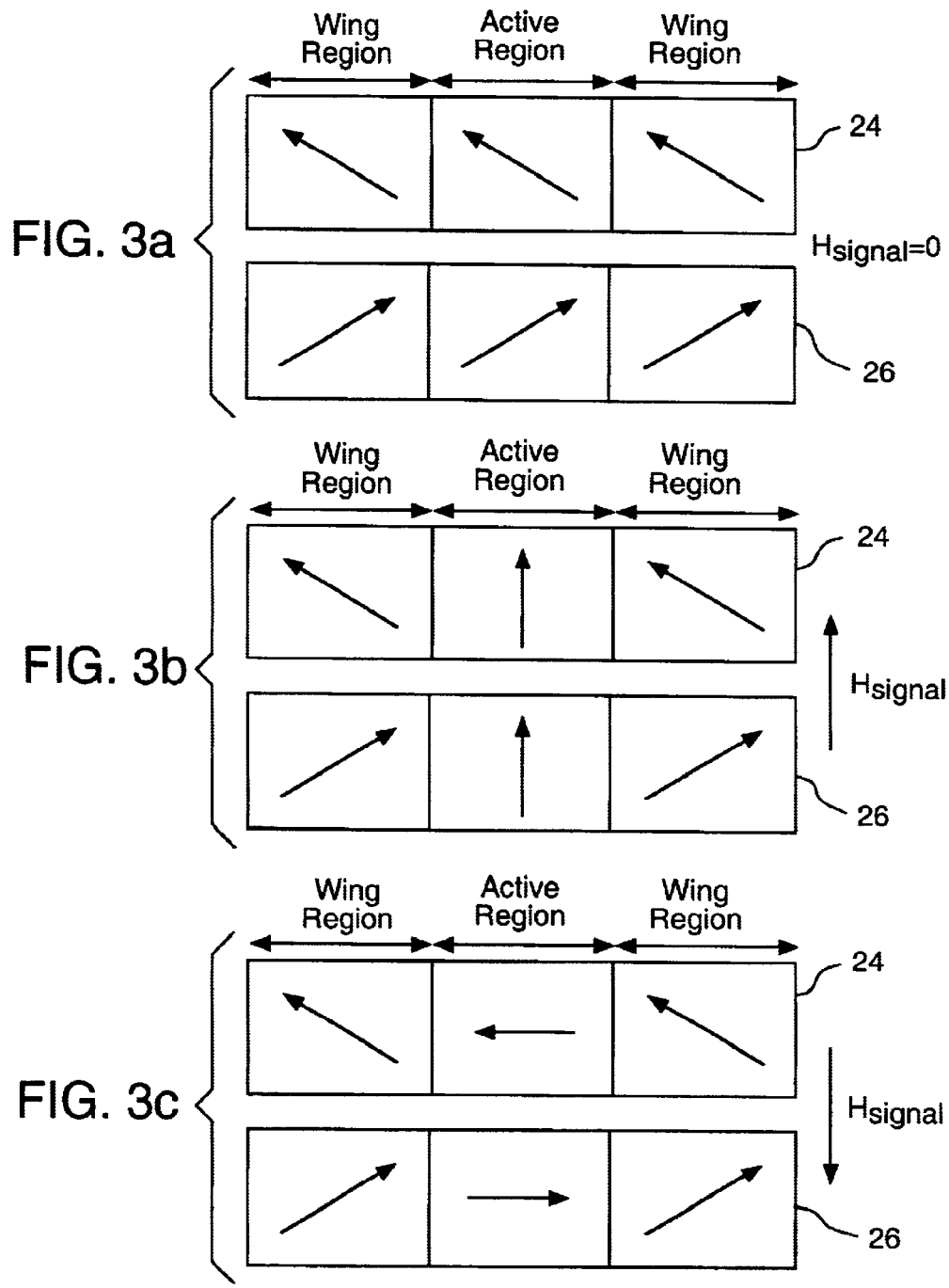
FIGS. 3a–c are diagrams illustrating the magnetizations of the ferromagnetic layers of the read head of FIGS. 1 and 2 in the active and wing regions during different conditions according to one embodiment of the present invention.

The operation of the read head 10, according to one embodiment of the present invention, is now described in conjunction with FIGS. 3a–c. FIGS. 3a–c are diagrams illustrating the magnetizations of the ferromagnetic layers 24, 26 in the active and wing regions 15, 16 during different conditions. FIG. 3a illustrates the magnetic orientations of the ferromagnetic layers 24, 26 during the quiescent state (i.e., a magnetic field caused by opposingly-oriented flux regions 14 of the medium is not present within the sensing region of the GMR element 20). FIG. 3a illustrates that the magnetic moments of the ferromagnetic layers 24, 26 are not perfectly anti-parallel, but rather a slight asymmetry exists. According to one embodiment, the asymmetry may be, for example, fifteen to sixty degrees relative to horizontal. As discussed hereinbefore, the magnetizations of the ferromagnetic layers 24, 26 are fixed in the wing regions 16 by the anti-ferromagnetic layers 32, 34 respectively. The magnetizations of the ferromagnetic layers 24, 26 in the active region 15 is influenced by the magnetic element 50. In this state, the electrical resistance of the GMR element 12 is at an intermediate value.

FIG. 3b is a diagram of the magnetizations of the ferromagnetic layers 24, 26 when a positive signal field ($H_{signal}$) is present (e.g., the transition 17 caused by opposingly-oriented flux regions 14 is present within the sensing region of the GMR element 20). The positive signal field causes the magnetic moments of the ferromagnetic layers 24, 26 in the active region 15 to rotate into a substantially aligned orientation, such that the electrical resistance of the GMR element 20 is at a minimum value.

FIG. 3c is a diagram of the magnetizations of the ferromagnetic layers 24, 26 when a negative signal field ($H_{signal}$) is present (e.g., the transition 18 caused by opposingly-oriented flux regions 14 is present with the sensing region of the GMR element 20). The negative signal field causes the magnetic moments of the ferromagnetic layers 24, 26 to rotate into a substantially opposed orientation, such that the electrical resistance of the GMR element 20 is at a maximum value.

As discussed hereinbefore, the resolution of the read head 10 is inversely proportional to the distance between the shield layers 36, 38 in the active region 15. Thus, according to one embodiment of the present invention, the thickness of the active region read sensor may be as small as 70 Å. This is significantly smaller than modern spin valve head designs because, with the present invention, the anti-ferromagnetic layers 32, 34 may be eliminated from the active region 15 because of the magnetic element 50. Accordingly, because the anti-ferromagnetic layers 32, 34 fix the magnetization of the ferromagnetic layers 24, 26 only in the wing regions 16, the thickness of the anti-ferromagnetic layers 32, 34 does not add to the thickness of the GMR element 20 in the active region 15 of the read head 10. Therefore, in contrast with current spin valve head designs, the anti-ferromagnetic layers 32, 34 do not detrimentally affect the resolution of the read head 10. Accordingly, the elimination of the anti-ferromagnetic layers 32, 34 in the active region 15 is likely to result in a higher GMR ratio with the present invention. In addition, according to such an embodiment, the electrically conductive layers 28, 30 on either side of the GMR element 20 may serve the purpose of reducing the sensing current fields in the ferromagnetic layers 24, 26 of the GMR element 20. Due to the spin-filter effect, it is expected that with the present invention the GMR effect will not be reduced by the presence of the electrically conductive layers 28, 30 in the active region 15.

Figure 4:
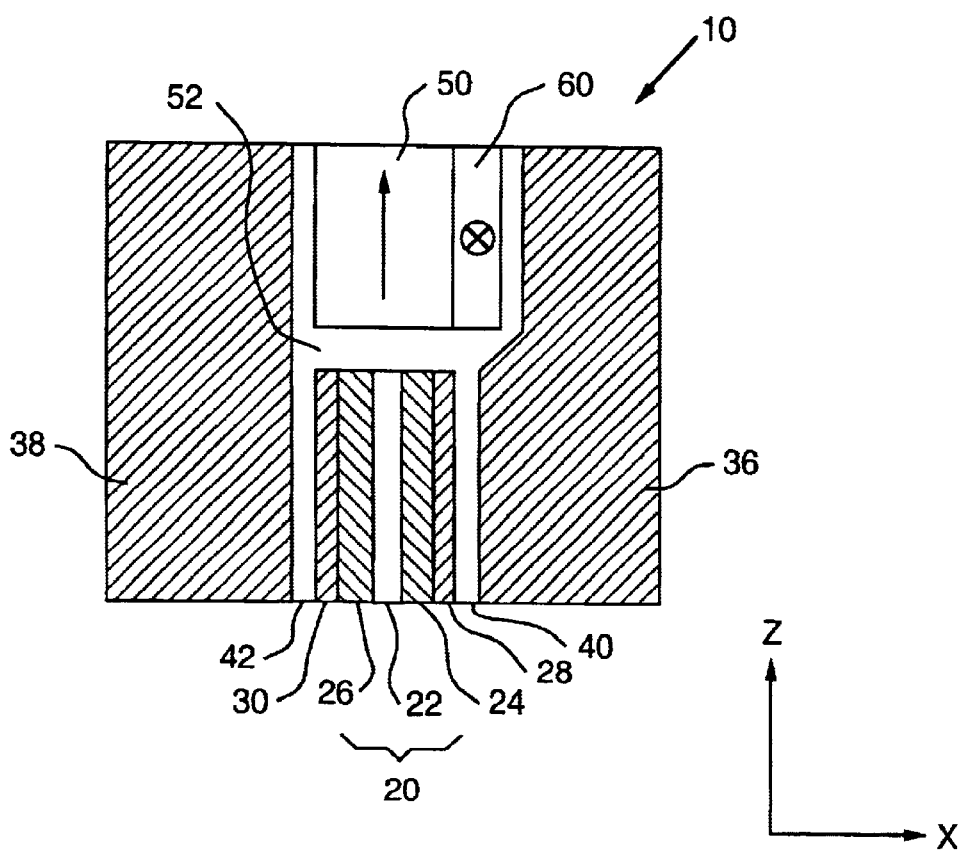
FIG. 4 is a cross-sectional front side view of a read head according to another embodiment of the present invention.

As discussed hereinbefore, the magnetic element 50 may be fabricated from a soft magnetic material. FIG. 4 is a cross-sectional front view diagram of the read head 10 according to such an embodiment. The read head 10 illustrated in FIG. 4 is similar to that illustrated in FIG. 1, except that the read head 10 of FIG. 4 includes a biasing layer 60 adjacent to the magnetic element 50. The biasing layer 60 may be fabricated from an electrically conductive/ magnetically non-conductive material such as, for example, copper. The biasing layer 60 may conduct a biasing current (indicated by ⊗ in FIG. 4) to influence the magnetization of the magnetic element 50. According to such an embodiment, the magnetic element 50 may be fabricated from a soft magnetic material such as, for example, copper-iron or nickel-iron. In addition, according to such an embodiment, the current flowing through the biasing layer 60 may be varied to consequently vary the magnetic moment of the magnetic element 50, which in turn influences the magnetic moments of the ferromagnetic layers 24, 26 in the active region 15.

Figure 5:
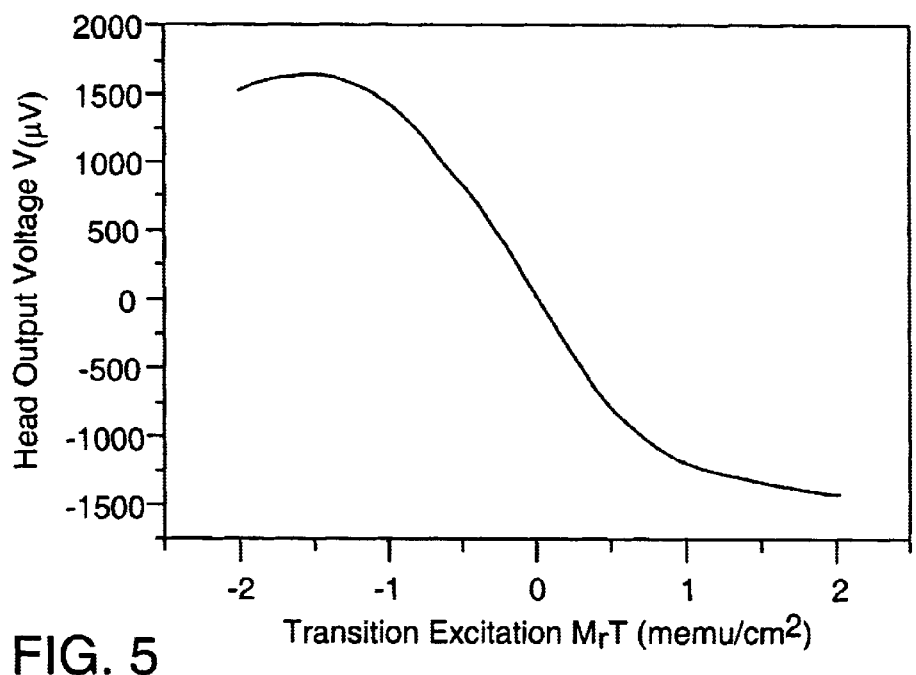
FIG. 5 is a graph of the calculated transfer curve for a read head according to one embodiment of the present invention.
Figure 6:
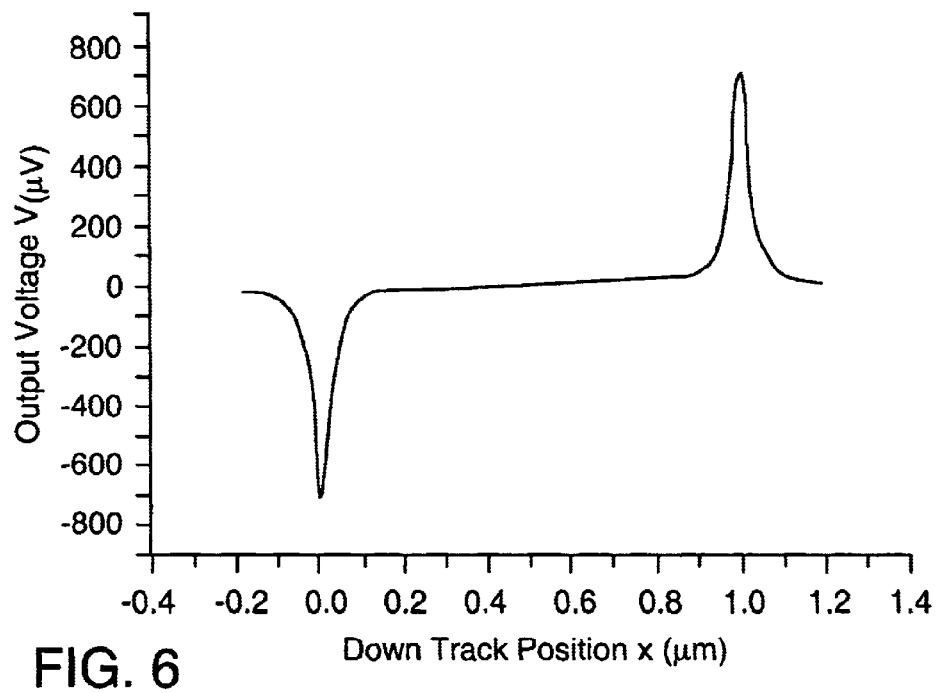
FIG. 6 is a graph of the calculated read back voltage waveform for a read head according to one embodiment of the present invention.
Figure 7:
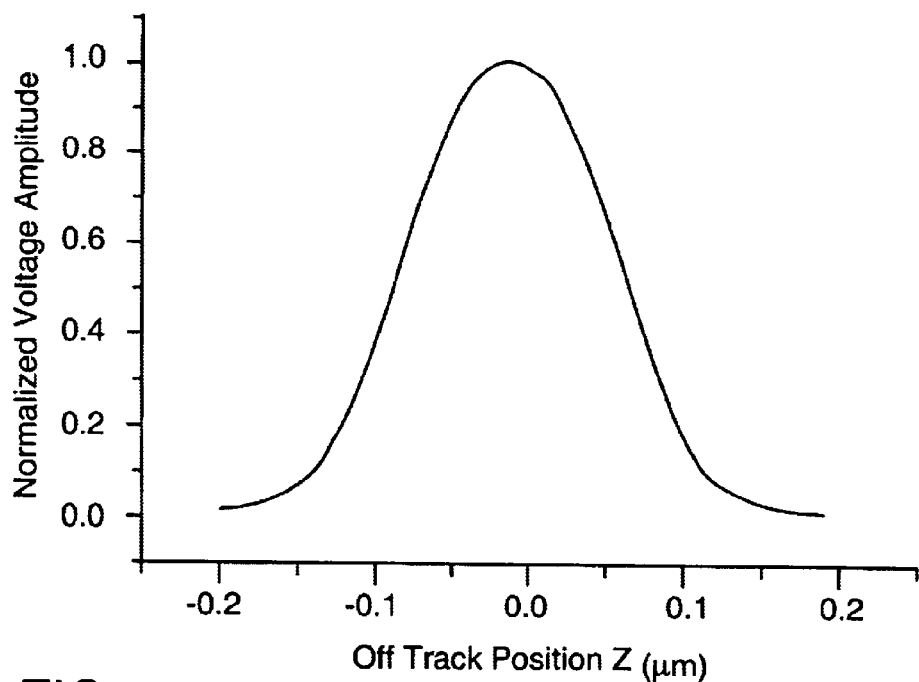
FIG. 7 is a graph of the calculated cross-track profile for a read head according to one embodiment of the present invention.

FIGS. 5–7 illustrate experimental results obtained for the read head 10 described hereinbefore with respect to FIGS. 1 and 2 using micromagnetic modeling. The experimental results were determined using the following properties for the read head 10: the active region read sensor (i.e., GMR element 20 and the two conducting layers 28, 30) has a sheet resistance of 15 Ω/sq and a GMR ratio of 15%. The structure of the active region read sensor was modeled as:

Conducting layer 28: copper—10 Å thick
Ferromagnetic layer 24: NiFe—20 Å thick
Non-magnetic metal layer 22: copper—20 Å thick
Ferromagnetic layer 26: NiFe—20 Å thick
Conducting layer 30: copper—10 Å thick The insulating layers 40, 42 on each side of the active region read sensor were assumed to be 16 nm. The exchange pinning field from the anti-ferromagnetic layers 32, 34 at the wing regions 16 was assumed to be 500 Oe. The pinning field direction for one of the ferromagnetic layers 24 was assumed to be 35° with respect to the normal direction to the air bearing surface and −45° for the other ferromagnetic layer 26. The distance D between the read head 10 and the medium was assumed to be 9 nm. The track width of the read head 10 (i.e., the width in the Y direction of the active region 15) was assumed to be 0.1 μm. The sense reference current from the read circuit was assumed to be 0.8 mA, yielding a current density of approximately $2.3 \times 10^8$ A/cm$^2$.

FIG. 5 is a graph of the calculated transfer curve for the read head 10. FIG. 5 illustrates that the transfer curve shows robust performance with great head stability. At a medium moment of 0.4 memu/cm$^2$, the peak-to-peak voltage amplitude is approximately 1.4 mV and the amplitude asymmetry is below one percent.

FIG. 6 is a graph of the calculated read back voltage waveform. FIG. 6 illustrates that the PW50s for both positive and negative pulse are approximately 0.056 µm.

FIG. 7 is a graph of the calculated cross-track profile. The write track width was assumed to be 0.15 µm. FIG. 7 illustrates that the calculated magnetic read track width is approximately 0.1 µm, exactly the same as the physical read track width.

Figure 8:
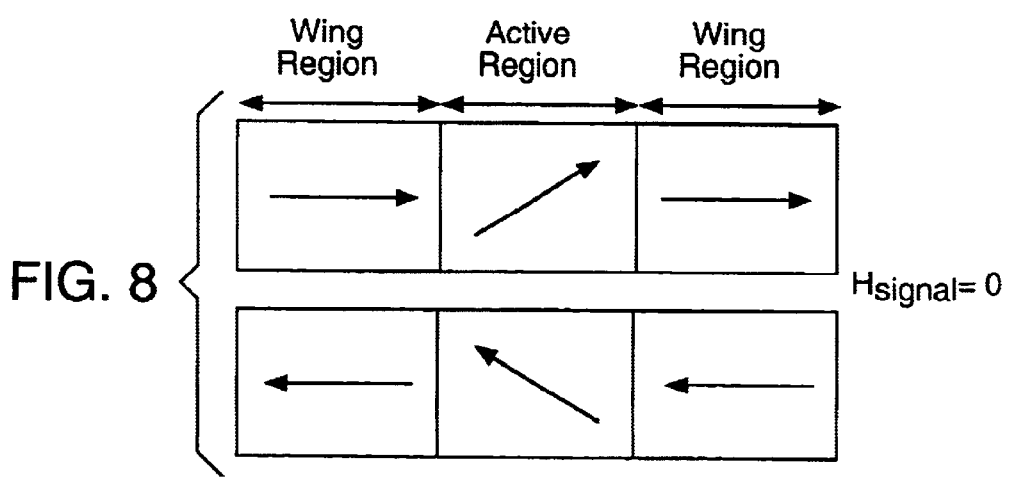
FIG. 8 is a diagram of the magnetizations of the ferromagnetic layers in the active and wings regions of a read head according to another embodiment of the present invention.

According to another embodiment of the present invention, the magnetizations of the ferromagnetic layers 24, 26 may be pinned in opposite horizontal directions, as opposed to being pinned at canted angles, as described hereinbefore with respect to FIGS. 3a–c. FIG. 8 is a diagram of the magnetizations of the ferromagnetic layers 24, 26 in the active and wind regions during the quiescent state ($H_{signal}=0$) according to such an embodiment.

Figure 9:
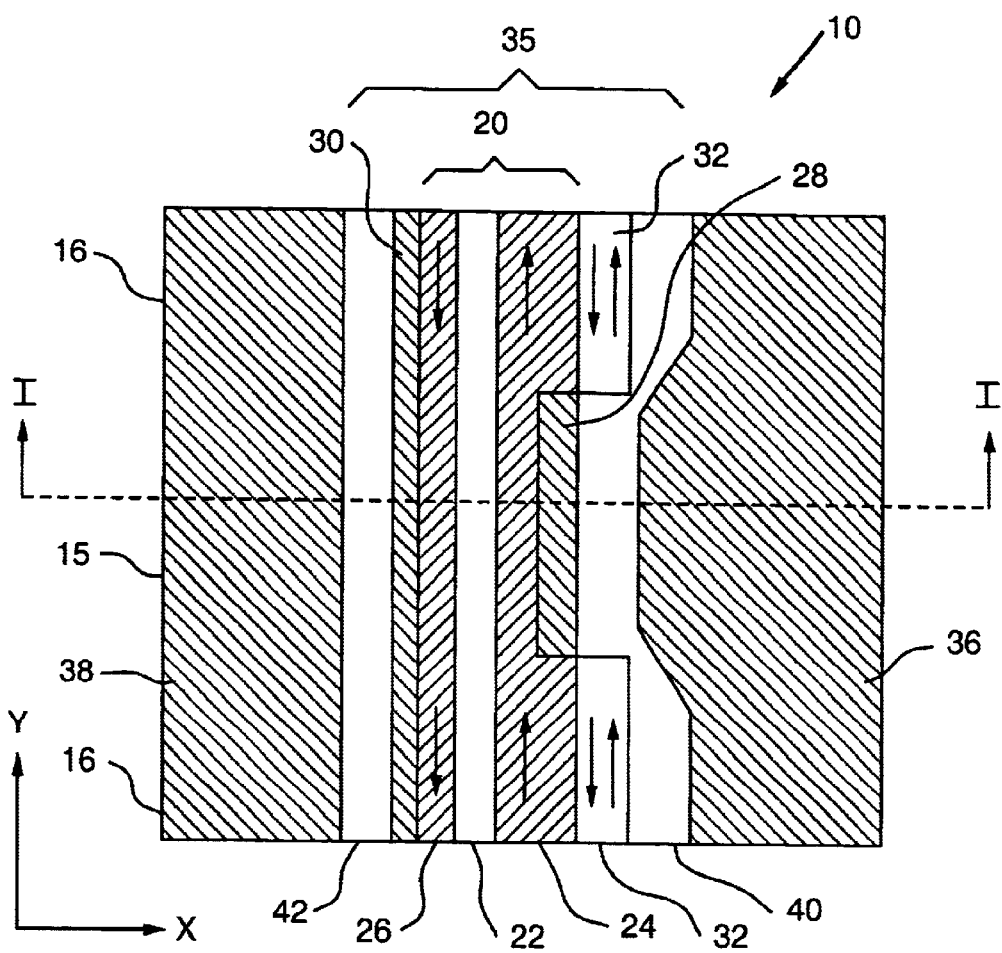
FIG. 9 is a bottom view of a read head according to another embodiment of the present invention.

FIG. 9 is a bottom view of the read head 10 according to another embodiment of the present invention. The read head 10 illustrated in FIG. 9 is similar to that illustrated in FIG. 2, except that only one of the ferromagnetic layers of the GMR element 20 (ferromagnetic layer 24 in the illustrated embodiment) is pinned in the wing regions 16 by an anti-ferromagnetic layer (anti-ferromagnetic layer 32 in the illustrated embodiment). In addition, according to one embodiment, the thickness of the pinned ferromagnetic layer 24 may be greater in the wing regions 16 than in the active region 15 of the GMR element 20 to provide sufficient magnetic flux for the ferromagnetic layer 26 at the ends. The magnetization of the ferromagnetic layer 26 may be set opposite to the magnetization of the pinned ferromagnetic layer 24 in the wing regions 16. According to such an embodiment, the magnetostatic coupling at the ends between the ferromagnetic layers 24, 26 may stabilize the wing regions 16 of the ferromagnetic layer 26 so that there is no need for exchange pinning of both ferromagnetic layers 24, 26. Hence, according to such an embodiment, the other anti-ferromagnetic layer (anti-ferromagnetic layer 34 in FIG. 2) may be eliminated. As discussed hereinbefore, the magnetic element 50 (see FIGS. 1 and 4) may create a transverse bias field in the two ferromagnetic layers 24, 26.

Figure 10:
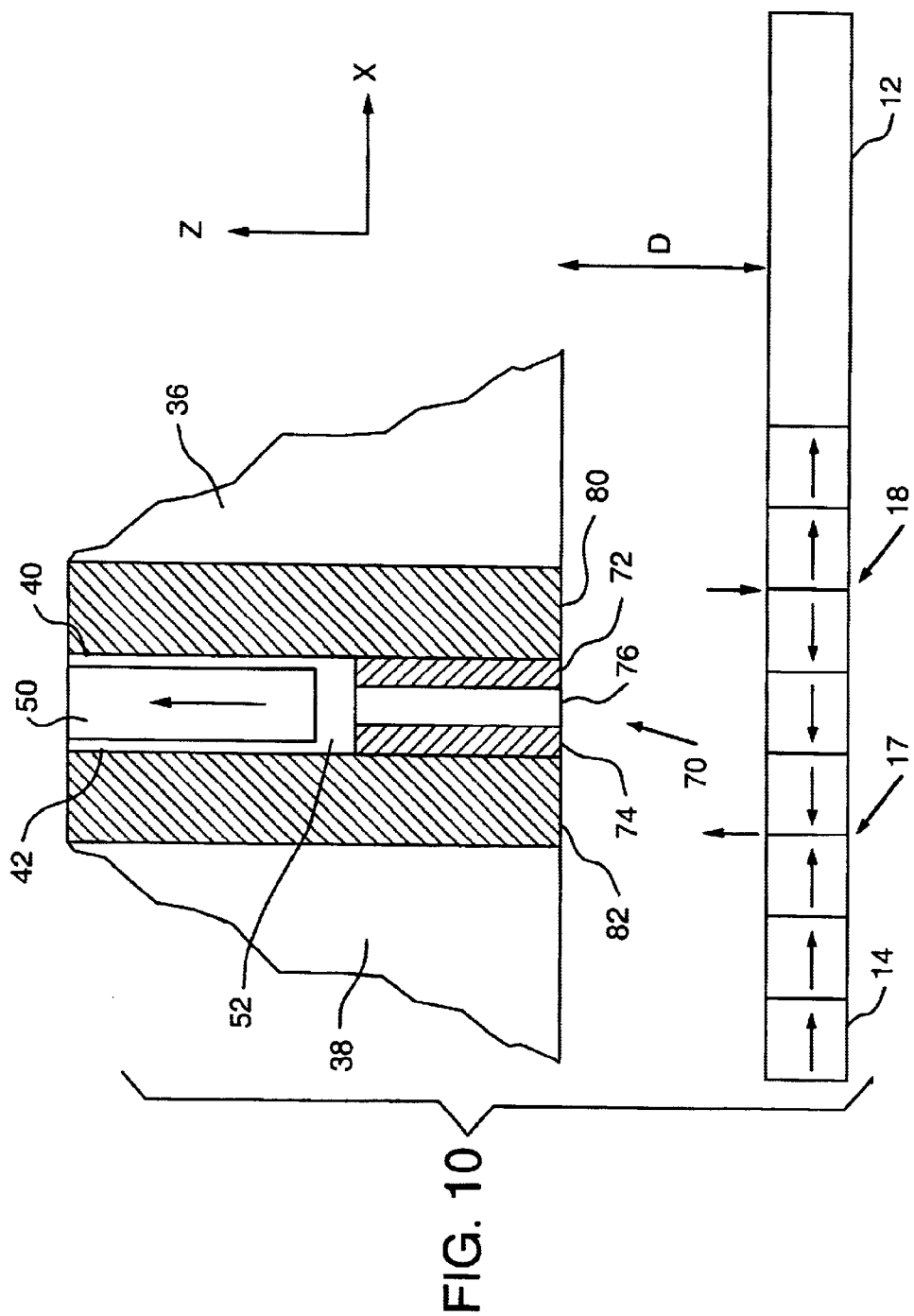
FIG. 10 is a cross-sectional front side view of a read head according to another embodiment of the present invention.

FIG. 10 is a cross-sectional side view of the read head 10 according to another embodiment of the present invention. The read head 10 of FIG. 10 is similar to that of FIG. 1, except that it includes a tunneling magnetoresistive (TMR) element 70. According to one embodiment, the TMR element 70 is a tunneling junction tri-layer including two ferromagnetic layers 72, 74 sandwiching a barrier layer 76. The ferromagnetic layers 72, 74 may be similar in construction to the ferromagnetic layers 24, 26 described hereinbefore with respect to the GMR read head of FIGS. 1–9. The barrier layer 76 may be fabricated from an electrically and magnetically non-conductive material such as, for example, $Al_2O_3$, and may have a thickness of, for example, 0.2 to 5 nm. The TMR read head 10 may also include conducting electrode layers 80, 82 sandwiching the ferromagnetic layers 72, 74. The conducting electrode layers 80, 82 may be fabricated from an electrically conductive/magnetically non-conductive material such as, for example, copper. An electrical sense current may be applied to the TMR element 70 from a read circuit (not shown) via the conducting electrode layers 80, 82. As discussed hereinbefore, the magnetic element 50 (see FIGS. 1 and 4) may create a transverse bias field in the two ferromagnetic layers 72, 74.

According to such an embodiment, operation of the read head 10 may be based on the phenomenon of spin-polarized electron tunneling. One of the ferromagnetic layers of the TMR element 70 (such as the ferromagnetic layer 72) may have a higher saturation field in one direction of an applied magnetic field due to its high coercivity than the other ferromagnetic layer (such as the ferromagnetic layer 74). The barrier layer 76 may be thin enough that quantum mechanical tunneling occurs between the ferromagnetic layers 72, 74. The tunneling phenomenon may be electrical-spin dependent, such that the magnetic response of the TMR element 70 is a function of the relative orientations and spin polarizations of the ferromagnetic layers 72, 74.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. A magnetoresistive read head, comprising:
a magnetoresistive element including a lower surface and an upper surface, wherein an electrical resistance of the magnetoresistive element varies in response to varying magnetic fields adjacent to the lower surface of the magnetoresistive element, the magnetoresistive element including first and second ferromagnetic layers and a non-magnetic layer therebetween, wherein the first and second ferromagnetic layers are magnetically unpinned in an active region of the magnetoresistive element; and
a magnetic element adjacent to the upper surface of the magnetoresistive element, the magnetic element having a permanent magnetization that is substantially orthogonal to the lower surface of the magnetoresistive element.

2. The magnetoresistive read head of claim 1, wherein the magnetoresistive element is selected from the group consisting of a giant magnetoresistive element and a tunneling magnetoresistive element.

3. The magnetoresistive read head of claim 1, wherein the magnetic element includes a hard magnetic material.

4. The magnetoresistive read head of claim 3, wherein the hard magnetic material of the magnetic element includes a cobalt/platinum alloy.

5. The magnetoresistive read head of claim 1, wherein the magnetic element includes a soft magnetic material.

6. The magnetoresistive read head of claim 5, wherein the magnetic element includes a soft magnetic material selected from the group consisting of copper-iron and nickel-iron.

7. The magnetoresistive read head of claim 5, further comprising an electrically conductive biasing layer adjacent to the magnetic element.

8. The magnetoresistive read head of claim 7, wherein the electrically conductive biasing layer is for conducting a varying bias cunent such that the magnitude of the permanent magnetization of the magnetic element is varied.

9. The magnetoresistive read head of claim 1, further comprising a first anti-ferromagnetic layer adjacent to the first ferromagnetic layer in a wing region of the magnetoresistive element.

10. The magnetoresistive read head of claim 9, further comprising a second anti-ferromagnetic layer adjacent to the second ferromagnetic layer in the wing region.

11. The magnetoresistive read head of claim 1, wherein the non-magnetic layer of the magnetoresistive element includes a material is selected from the group consisting of copper and aluminum oxide.

12. A method of reading data recorded on a magnetic medium, comprising:

moving a magnetoresistive element relative to the magnetic medium such that a lower surface of the magnetoresistive element faces the magnetic medium, wherein the magnetoresistive element includes two ferromagnetic layers than are unpinned in an active region of the magnetoresistive element and pinned in a wing region of the magnetoresistive element; and biasing the two ferromagnetic layers of the magnetoresistive element in the active region of the magnetoresistive element with a transverse magnetic field that is substantially orthogonal to a plane of the lower surface of the magnetoresistive element.

13. The method of claim 12, further comprising pinning a magnetization of the two ferromagnetic layers in a wing region of the magnetoresistive element.

14. The method of claim 12, further comprising varying the transverse magnetic field.

15. A magnetoresistive read head, comprising:

a magnetoresistive element having an air bearing surface and including first and second ferromagnetic layers, wherein the first and second ferromagnetic layers are unpinned in an active region of the magnetoresistive element and pinned in a wing region of the magnetoresistive element; and a magnetic element adjacent to the magnetoresistive element and having a permanent magnetization oriented in a direction substantially orthogonal to the air bearing surface of the magnetoresistive element.

16. The magnetoresistive read head of claim 15, wherein the magnetoresistive element is selected from the group consisting of a giant magnetoresistive element and a tunneling magnetoresistive element.

17. The magnetoresistive read head of claim 15, wherein the magnetic element includes a material selected from the group consisting of a hard magnetic material and a soft magnetic material.

18. The magnetoresistive read head of claim 15, further comprising a first anti-ferromagnetic layer adjacent to the first ferromagnetic layer in the wing region.

19. The magnetoresistive read head of claim 18, further comprising a second anti-ferromagnetic layer adjacent to the second ferromagnetic layer in the wing region.

20. A magnetoresistive read head, comprising:

a sensor stack having an air bearing surface and including an active region and a wing region, wherein the sensor stack includes a giant magnetoresistive element including first and second ferromagnetic layers and a third layer between the first and second ferromagnetic layers, wherein the third layer includes an electrically conductive/magnetically non-conductive material; and a magnetic element adjacent to the sensor stack and having a permanent magnetization oriented in a direction substantially orthogonal to the air bearing surface of the magnetoresistive element.

21. The magnetoresistive read head of claim 20, wherein the magnetic element includes a hard magnetic material.

22. The magnetoresistive read head of claim 20, wherein the magnetic element includes a soft magnetic material.

23. The magnetoresistive read head of claim 22, further comprising an electrically conductive biasing layer adjacent to the magnetic element.

24. The magnetoresistive read head of claim 23, wherein the electrically conductive biasing layer is for conducting a varying bias current such that the magnitude of the permanent magnetization of the magnetic element is varied.

25. The magnetoresistive read head of claim 20, wherein the sensor stack is between first and second shield layers.

26. The magnetoresistive read head of claim 25, wherein a thickness of the sensor stack in the active region is less than one hundred Angstroms.

27. The magnetoresistive read head of claim 26, wherein the sensor stack includes a first electrically conductive layer adjacent to the first ferromagnetic layer and a second electrically conductive layer adjacent to the second ferromagnetic layer.

28. The magnetoresistive read head of claim 27, wherein:

the first and second ferromagnetic layers each have a thickness in the active region of the sensor stack of approximately twenty Angstroms;

the third layer has a thickness in the active region of the sensor stack of approximately twenty Angstroms; and the first and second electrically conductive layers have a thickness in the active region of the sensor stack of less than twenty Angstroms.

29. The magnetoresistive read head of claim 27, further comprising:

a first insulating layer between the first electrically conductive layer and the first shield layer; and a second insulating layer between the second electrically conductive layer and the second shield layer.

30. The magnetoresistive read head of claim 20, wherein the sensor stack includes a first anti-ferromagnetic layer adjacent to the first ferromagnetic layer in the wing region.

31. The magnetoresistive read head of claim 30, wherein the sensor stack includes a second anti-ferromagnetic layer adjacent to the second ferromagnetic layer in the wing region.

32. The magnetoresistive read head of claim 31, wherein each of the first and second anti-ferromagnetic layers are selected from a material selected from the group consisting of IrMn, IrPtPd, IrPt, and NiMn.

33. A magnetoresistive read head, comprising:

a sensor stack including an active region and a wing region, wherein the sensor stack includes a giant magnetoresistive element including first and second ferromagnetic layers sandwiching a third layer;

means for pinning a magnetization of at least one of first and second ferromagnetic layers in the wing region of the sensor stack; and means for biasing the first and second ferromagnetic layers in the active region of the sensor stack with a transverse magnetic field.

34. The magnetoresistive read head of claim 33, wherein the means for pinning includes means for pinning a magnetization of both the first and second ferromagnetic layers in the wing region of the sensor stack.

35. The magnetoresistive read head of claim 33, further comprising means for varying the transverse magnetic field.

* * * * *

UNITED STATES PATENT AND TRADEMARK OFFICE
CERTIFICATE OF CORRECTION

PATENT NO. : 6,667,862 B2
DATED : December 23, 2003
INVENTOR(S) : Zhu

It is certified that error appears in the above-identified patent and that said Letters Patent is hereby corrected as shown below:

Column 3,
Line 44, remove "-x" and replace therewith -- -X --.
Line 49, remove "-z" and replace therewith -- -Z --.

Column 6,
Line 56, remove "35°" and replace therewith -- $35^0$ --.
Line 57, remove "-45°" and replace therewith -- $-45^0$ --.

Column 7,
Line 18, remove "($H_{signal=}O$)" and replace therewith -- ($H_{signal}=O$) --.

Signed and Sealed this

First Day of June, 2004

JON W. DUDAS
*Acting Director of the United States Patent and Trademark Office*